United States Patent [19]

Wehrli et al.

[11] Patent Number: 4,698,378

[45] Date of Patent: Oct. 6, 1987

[54] PROCEDURE FOR THE CONTINUOUS PRODUCTION OF FREE FLOWING AND HOMOGENOUS MIXTURES OF PLASTIC MATERIALS WITH ADMIXTURES

[75] Inventors: Werner Wehrli, Basel; Peter Franz, Birsfelden, both of Switzerland

[73] Assignee: Buss AG, Basel, Switzerland

[21] Appl. No.: 783,339

[22] PCT Filed: Dec. 20, 1982

[86] PCT No.: PCT/CH82/00135

§ 371 Date: Aug. 6, 1984

§ 102(e) Date: Aug. 6, 1984

[87] PCT Pub. No.: WO84/02530

PCT Pub. Date: Jul. 5, 1984

Related U.S. Application Data

[63] Continuation-in-part of Ser. No. 642,917, Aug. 6, 1984, abandoned.

[51] Int. Cl.[4] ............................................. C08J 3/22
[52] U.S. Cl. .................................... 523/318; 523/307; 523/309
[58] Field of Search .................... 523/307, 309, 318

[56] References Cited

U.S. PATENT DOCUMENTS 4,252,844  2/1981  Nesgood et al. .................. 427/213
4,322,170  3/1982  Papenmeier ...................... 366/141

FOREIGN PATENT DOCUMENTS 561630     4/1958   Belgium .
0034548A1  8/1981   European Pat. Off. ............ 523/318
3014741   10/1981   Fed. Rep. of Germany .
3125396    1/1983   Fed. Rep. of Germany .
56-155623 12/1981   Japan .............................. 523/318
1374499   11/1974   United Kingdom .
2087247A   5/1982   United Kingdom .

Primary Examiner—Paul R. Michl
Attorney, Agent, or Firm—Benoit Law Corporation

[57] ABSTRACT

Processes for continuous conversion of granulated PVC material and additive substances to free-flowing pre-blends mechanically intermix at room temperature granulated PVC material and additive substances in a first zone continuously transversed thereby to provide a macroscopically homogeneous admixture thereof. The additive substances are melted in a subsequent second zone and the molten additive substances are absorbed with the granulated PVC material in a subsequent third zone to provide the free-flowing pre-blend. This pre-blend advantageously may be passed through a second set of three zones corresponding to the mentioned first, second and third zones.

16 Claims, 6 Drawing Figures

PROCEDURE FOR THE CONTINUOUS PRODUCTION OF FREE FLOWING AND HOMOGENOUS MIXTURES OF PLASTIC MATERIALS WITH ADMIXTURES

This is a continuation-in-part of our copending patent application Ser. No. 06/642,917, filed Aug. 6, 1984, now abandoned, for Procedure for the Continuous Production of Free Flowing and Homogeneous Mixtures of Plastic Materials with Admixtures, and assigned to BUSS AG, of Switzerland.

The subject invention relates to a process for continuously converting PVC and additives, possibly with fillers, to a free flowing plastics pre-blend, and refers to a procedure for the dispersion of granular or pulverized solids with liquid components, in particular for the continuous production of PVC-Dry-Blend in a vertical continuous blender provided with centrifugal disks rotating from a vertical shaft.

It is the task of the invention to propose a procedure capable of producing reactive and free flowing powders or agglomerates by means of blending and wetting granular or pulverized solids with liquids. In order to reduce the thermic stress to a minimum during the blending process and by maintaining the blending quality, that is, because either the solid particles and/or the liquid component are sensitive to a prolonged thermic exposure, the blending time is to be reduced to a few seconds.

This process enables a confectioning of granulated PVC materials in the sense of stabilizing the PVC in such a manner that it subsequently resists the high requirements at elevated temperatures in a kneading machine or other further processing apparatus. In this respect, the decomposition temperature is lower than the further processing temperature, so that the decomposition temperature need to be increased. This enables the prepared product to be processed further at high temperatures, without being decomposed thereby.

According to prevalent opinions, during a "dry blend", a PVC-Hot-Mixture must reach a blending temperature that is below the plasticization range of a PVC-mixture, e.g., depending on the preparation procedure, between 85° and 150° C.

For plasticized PVC a softening agent is added at 50° to 60° C. For unplasticized PVC the plastic raw material will be heated to the point of softening or melting in order to agglomerate with the admixed stabilizers and possibly fillers and to form a free flowing sintered powder. According to prior art, for this level of preparation, machines that proceed step by step are applied. They are either slow running and heatable ribbon flights or plough bar blenders or fast running turbomixers with a small chamber volume whereby a hot mixer is frequently combined, with a subsequent cooling mixer, in order to quickly cool the batch. Since the temperature increase depends on the size of the batch, the specific temperature of the product and the introduction of energy per time unit and since the first two parameters are set, the developments always concentrated upon introducing higher levels of energy per time unit into the blend.

During the hot mixing or dry blend, that is blending and simultaneous heating of the PVC to just below the plasticization temperature, that is approx. 130° C., all additives are ground up, melted down and absorbed by the PVC-granulate. The product of the hot mixing process is called "dry blend". In order to produce "dry blend", energy introductions of 100-150 KJ/kg are deemed necessary.

Other plastic pre-blends are prepared in a similar manner.

Surprisingly, it has now been discovered that a high blending quality can be achieved even by a most gentle preparation process with minimal energy introduction, if the solids are vortexed at high revolutions and continuously dosaged into a continuous blender at room temperature and if the solids are simultaneously wetted by a highly heated liquid component. Hereby it is useful if the liquid component is heated acutely and immediately before dispersion.

For plasticized PVC it is advantageous if the liquid component is heated to 80°-200° C. and blown in. For unplasticized PVC, the passage slit between the inner wall of the housing and the continuous mixer and the rotors in form of centrifugal disks, is made smaller in an essentially known manner and high energies can thus be introduced kinematically into the penetrating material. The additives melt within a fraction of a second thus blending with the added solid admixtures. Cooling takes place in the process and a free flowing powder is thus formed.

The momentary thermic stress is advantageously short due to the very short dwelling or residence time. The procedure is simple, low in costs and fast, resulting in a high quality blend.

With regard to the definition of residence time, the following should be further explained. In principle, the result of a continuous mixing depends to a decisive extent on the introduction of the individual components within the time unit. The more constant the individual components are added within the time unit, the easier the task for the continouus mixer. The border line case of a continuous mixer requires a theoretical volume near zero, namely then when the dosage could be controlled so precisely, that, according to the required blending proportions, the particles of the components are brought together individually. Since this is not practically possible, blending times are necessary similarly as in batch mixers. Instead of using the term blending time one speaks now of residence time. For the achievement of a high blending quality, a residence time as short as possible is endeavoured. However, this short residence time in the mixing area does not allow for sufficient heat supply by means of heating the mixing tools and walls which was considered indispensable up to now. Furthermore, the mechanical stress of the particles was insufficient during the blending process.

All of the above problems and disadvantages are being solved advantageously according to the procedures of the subject invention. The required quality of the blend is easily attained by means of the proposed heating of the liquid component. In case the liquid component reacts sensitively to a temporary thermic stress, the heating takes place in an instantly effective continuous flow heater immediately before injection.

According to an aspect of the subject invention, a process for a continuous conversion of granulated PVC material and additive substances to a free-flowing pre-blend, comprises, in combination, the steps of mechanically intermixing at room temperature the PVC material and additive substances or starting materials in a first zone continuously transversed thereby to provide a macroscopically homogeneous admixture thereof, melting the additive substances in a subsequent second zone, and absorbing the molten additive substances with the granulated PVC material in a subsequent third zone, so that granulated PVC having a momentarily sticky surface occurs, to which filler, if present, adheres. It is thereby advantageous to vortex the starting materials in the first zone mechanically and to heat them by mechanical friction momentarily in the second zone. Mechanical vortexing of the starting materials may be effected by means of a rotating disc mixer at high revolutions, wherein the starting materials subsequently are driven through a narrow gap in which a melting of the additives takes place.

It is further useful to wet the macroscopically homogeneous admixture of PVC material and additive substances or starting materials additionally with at least one heated liquid component.

It is also advantageous to pass the pre-blend through a second set of three zones corresponding to the above mentioned first, second and third zones.

Apparatus for the performance of the proposed procedure are shown by way of example in the accompanying drawings in which.

Figure 1:
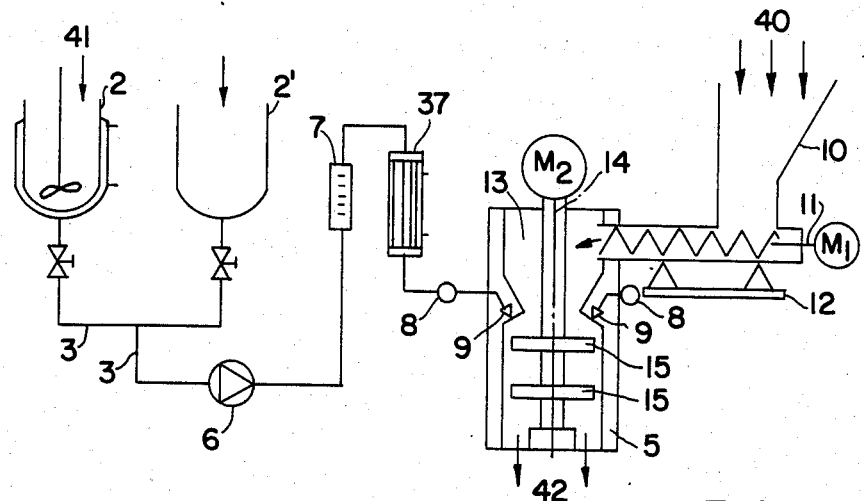
FIG. 1 is a schematic drawing of the apparatus.

An apparatus as cited by means of example in FIG. 1 is being used for the dispersion of granular or pulverized solids with liquid components, particularly in the continuous production of plasticized PVC Dry-Blend. The apparatus according to FIG. 6 serves in the preparation of free flowing unplasticized PVC pre-blends.

As evident in FIG. 1, the schematically presented apparatus is provided with a container 2 with a heating jacket and a stirring apparatus for the acceptance of the liquid components and is connected by means of a pipe 3 to a vertical continuous mixer 13 which is provided with a cylindrical housing 5.

The housing length corresponds to approximately the doubled diameter of the housing. A container 2' is switchable to the pipe 3 and serves for the acceptance of a rinsing liquid for the purpose of cleaning the continuous mixer 13 when changing liquid components.

The inside of the pipe 3 is provided with a dosing or spinning pump 6, a retroheater 37 and a flowmeter 7. The pipe 3 mentioned above is connected to an annular pipe 8 surrounding the housing 5 and provided with injection nozzles 9 leading into the inner side of the housing 5 through which the liquid components will be injected from the container 2 into the continuous mixer 13.

A balance silo 10 which is provided on its floor with a discharge screw 11 which leads into the housing 5 of the continuous mixer 13 serves for the acceptance of solids. The outlet of the discharge screw 11 is located somewhat above the annular pipe 8 in the housing 5. The silo 10 as well as the discharge screw 11 are arranged on a platform balance 12. The discharge screw 11 is driven by the regulating motor $M_1$. The vertically arranged continuous mixer 13 is provided with a vertical shaft 14 extending downwards, equipped with two rotors 15. The shaft 14 is driven by a motor $M_2$ arranged on top. The detailed embodiment of the continuous mixer 13 can be seen in FIG. 2-5. The housing 5 of the continuous mixer is provided with bearings 28 in which the shaft 14 is overhung. The upper end of the shaft 14 extends from the housing 5 and is provided with a pulley 29 which is in connection by means of a driving belt 30 with the motor $M_2$ not presented here. The lower end 31 of the shaft 14 is tapered and is equipped with two rotors 15 tightly arranged above each others. In the area of the rotors 15 the wall 39 of the housing 5 is smooth and above the upper rotor 15 an annular contraction 32 is provided where one to three injection nozzles 9 for the liquid components are arranged. The entire cylindrical housing 5 is parted and can be folded out; it is suspended from a triangular mounting plate 33 and held together by means of clamping screws. The mounting plate 33 is resting on mounting buffers 33' and the housing 5 is held by two columns 34 and a rocking shaft 35. For the purpose of supplying solid pre-blends, the discharge screw 11 is connected to the nozzle 36 on the housing 5.

Figure 4:
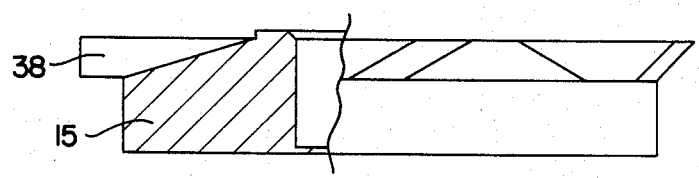
FIG. 4 is an enlarged presentation of a rotor, partially in vertical section.
Figure 5:
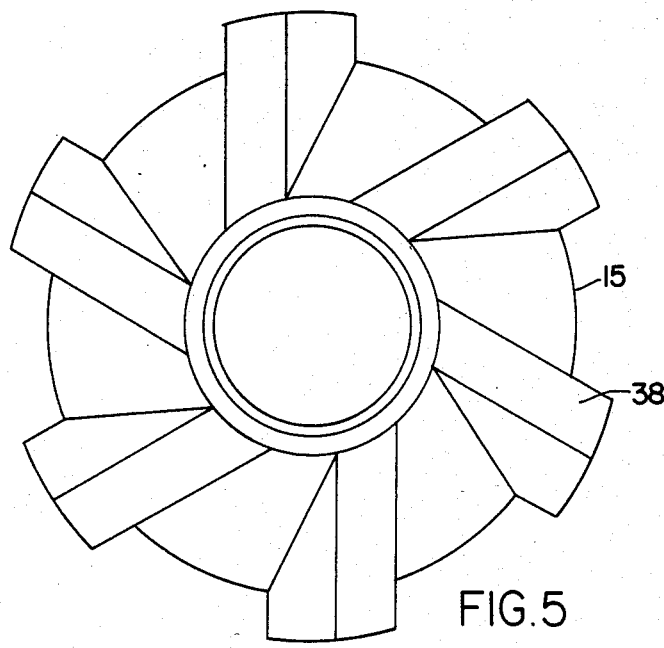
FIG. 5 is a top view of the rotor.

The shape of the rotor disks 15 can be seen in FIG. 4 and 5. They are provided with radially distributed wings 38. However, other suitable rotor forms can be used whereby they are adjustable to a tangential velocity of 3–50 m/sec. An essential reduction of mean residence time, preferably to 2–5 seconds, of the product between the rotors, that is between the lower rotor and the outlet, could be achieved by means of the above described simple arrangement of the rotors and the smooth housing walls to the effect, that a sticking of the parts of the mixing aggregate, which are in contact with the product, is avoided. The high revolution of the shaft, at preferably 2000–7000 rpm and the constructive execution of the mixing aggregate allow an unimpeded continuous production of high quality solid dispersions at a minimal expenditure of energy which is only approx. 0.01–0.08 kWh/kg. The axial length of the mixing zone approximately corresponds with the diameter of the housing 5 of the device. The solid supply and the dry solid disintegration require the same length. From this results the total length of the procedural part in the housing which corresponds with the doubled diameter.

Due to the mounting described above, the shaft can be suspended or overhung whereby the bearing on the discharge end can be eliminated. This permits a free and unobstructed discharge from the mixing aggregate which is so important in the production of dispersions. The product can be degassified by applying a vacuum in a downpipe immediately after the discharge without necessitating any further heat supply. This is a very economical solution.

If the blend is not provided with a substantial proportion of a liquid component, e.g. if a free flowing and homogenous blend for unplasticized PVC is produced, then the liquid component must be produced kinematically in the form of softening and melting of the admixed additive portion by means of vortexing. Hereby equal dispersion of all additives is more critical and more difficult than with flexible blends.

Figure 6:
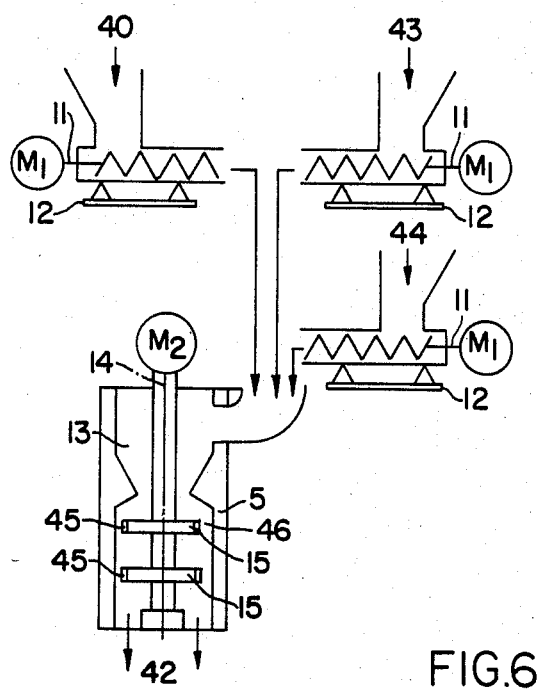
FIG. 6 is a variant of FIG. 1.
Figure 2:
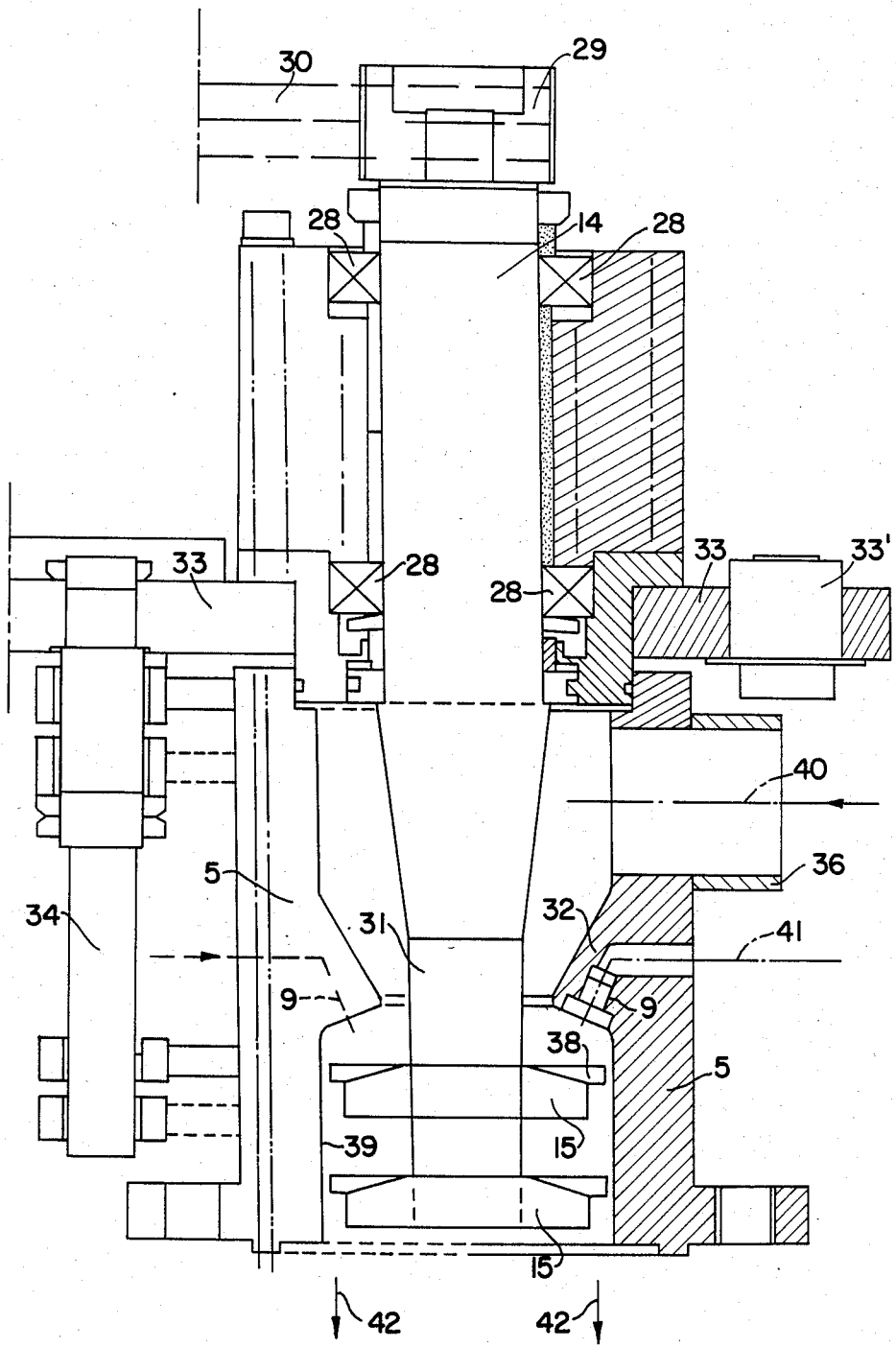
FIG. 2 is a vertical section of the blending device of the apparatus.
Figure 3:
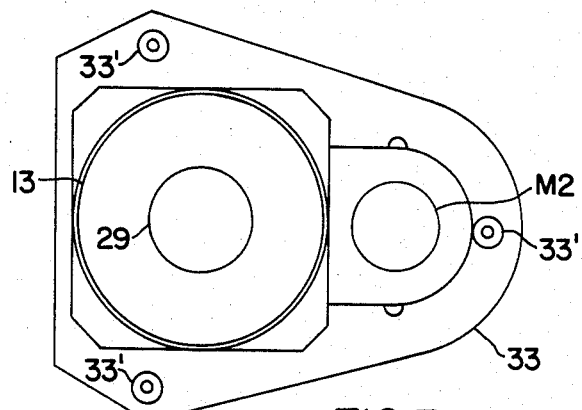
FIG. 3 is a plan view of the housing of the blending device.

The apparatus according to FIG. 6 has been adjusted to these requirements. The continuous mixer 13 is the same as in FIG. 1, however, without the injection nozzles.

PVC and filler and fed separately to the housing 5 at 40 and 43, respectively, with the aid of a volumetric or gravimetric feeders 11, and both go into the feed-through mixer 13 where the rotors 15 are located. Additives may be added at 44.

In order to narrow the passage slit 46 between the wall of the housing 5 and the rotor, rings 45 are clamped to the rotors 15. In order to be able to preselect the width of the slit clamping rings of various thickness are available.

Variations of shearing slit and revolution allow an adjustment of the energy to be introduced with respect to the quality specifications in such a manner that the temperature/time stress is kept to a minimal level.

Each of the rotor discs 15 and adjacent parts of the housing 5 establish zones for processing the materials fed through the apparatus 13. In particular, the starting materials are mechanically intermixed at room temperature in a first zone continuously transversed thereby, so that a macroscopically homogeneous admixture thereof is formed. That first zone is located immediately ahead of the top rotor 15, and there is such a first zone ahead of the or each subsequent rotor 15.

Melting of the additives then takes place in a subsequent second zone, which encompasses each rotor 15 between its periphery and the housing 5 at the narrow gap or shearing slit formed at wings 38.

The molten additives are absorbed by the granulated PVC in a subsequent third zone, so that granulated PVC having a momentarily sticky surface occurs, to which filler, if present, adheres. That third zone is the space or area located immediately after the top rotor 15.

It is thereby advantageous to vortex the starting materials in the first zone mechanically and to heat them by mechanical friction momentarily in the second zone. Mechanical vortexing of the staring materials may be effected by means of a disc mixer having rotor means 15 rotating at high revolutions, and these materials are subsequently driven through the narrow gap or second zone in which a melting of the additives takes place.

It is further useful to wet the macroscopically homogeneous admixture of starting materials additionally with highly heated liquid components.

According to the illustrated preferred embodiment of the invention, the processing apparatus 13 has disc-shaped mixing devices 15 arranged, one after another, on a shaft 14 situated in a closed vertical housing 5, and delimiting with the inside wall of that housing the gap or second zone in which the melting of the additives takes place.

Because the materials after admixture in the first zone are driven through a very narrow gap or second zone, a temperature increase occurs suddenly and locally limited, whereby the additives are melted and absorbed by the PVC granules. On the sticky or tacky surface of the PVC granules, the filler substances become stuck or adhere. This effectively solves a problem of prior-art approaches, since absorption of additives only takes place when they have a sufficient temperature. If the additives were too cold, a short transit time would be insufficient for absorption thereof by the PVC, in the absence of the narrow gap or second zone according to the subject invention.

The above mentioned first, second and third zones are repeated with the or each subsequent rotor 15, whereby each of the rotors 15 has a first zone located immediately ahead thereof, a second zone therearound, and a third zone immediately thereafter.

The proposed process may be employed for plasticized, as well as unplasticized or rigid PVC. It is thereby important that the temperature of dry blend is higher than 60°-80° C., since the additives are not absorbed at lower temperatures.

A confectioning of granulated PVC takes place in the sense that with the preparation according to the subject process, the PVC is so stabilized that it resists the higher requirements of subsequent processing in a kneading machine or other processing apparatus at high temperature.

The PVC blends made according to the subject invention are useful in the manufacture of practically all commercially manufactured and sold PVC articles, including PVC window frames or profile stock, PVC sheets, PVC tubing, and many more, and may be employed in extrusion, injection molding and other processes used in forming PVC articles.

An outstanding advantage of the subject invention is that the manufacturing process takes place continuously, rather than in stages, as in the prior art. In practice, this enables a one-step continuous-feed operation of the continuously running equipment, without the formerly customary step-by-step procedure, with intermediate storage of materials.

PVC dry blends produced according to the subject invention may be fed directly and continuously to kneading, extruding or molding equipment. This results in a substantial increase of throughput and production and product quality, at energy savings of from 10% to 50%.

Customarily, dry blend had to be cooled after its preparation in a separate cooling mixer. The subject invention dispenses with this requirement, since it enables the preparation of PVC dry blend at considerably lower temperatures than before.

Applications cited by way of example:

1. In a mixing apparatus; as described above in FIG. 1 as an exemplified embodiment, with a housing diameter of 100 mm and equipped with a dosing piston pump for the liquid component and a weighing belt for the solid preblend, and with the shaft of the mixing apparatus turning at 7000 rpm, liquid components were introduced at a temperature of 180° C. and solids at room temperature and 200-300 kg/h of dispersed powder was produced in continuous operation and, if necessary subsequently immediately deareated by means of a vacuum. Three injection nozzles were applied and two rotor disks arranged at the lower part of the shaft. Due to the very short residence time, the increased shorter wetting speed could be taken into account thus allowing for an unobstructed discharge of the dispersed product.

In this example, the liquid component may comprise a plasticizer, such as dioctylphtalate (DOP), diisooctylphtalate (DIOP), or tricresyl phosphate. Such plasticizer may be present in an amount of about 20% by weight of the liquid and solid pre-blends.

Solid pre-blends may comprise about 50% by weight of PVC and 5% by weight of additives, as well as filler. Suspension-type PVC with a K-factor or value of 57, 60 or 80 may be employed. Suitable additives include lead or organic stabilizers or polyethylene wax. Suitable fillers include chalk, calcium carbonate, titanium dioxyde or talcum.

2. The same arrangement as in the first example is used for the continuous homogenous preparation of plasticized PVC cable mass. In the vortex chamber a hot liquid component consisting of a mixture of 41 parts of diisooctylphthalat (DIOP), as a softener and 20 parts of chlorinated paraffin, 52% Cl, as an extender, is injected to 100 parts of suspension-PVC with a K-factor of 65, which was coarsely pre-blended with 70 parts of ground and surface treated calcium carbonate as a filler and 4.7 parts of tribasic lead(II) sulphate as a stabilizer. The continuous production yields a homogenous dryblend that is stable in storage.

3. Application cited by way of example according to FIG. 6: A continuous mixer with a housing diameter of 100 mm as described above was fed with PVC, filler and additives from three metering scales. These three solid parts were intensively vortexed and mixed and forced through two narrow shearing slits of 0.6 mm between the rotor and the housing wall. The revolutions of the rotor were 5000 rpm. The particles of the resulting free flowing and homogenous pre-blend were discharged at 95°–115° C. from the continuous mixer after a short mean residence time. The product could be stored without a special cooling step without it setting up. The throughput was 200 Kg/hr.

Bulk or suspension-type PVC may be employed in this example. By way of example, suspension PVC with a K-factor of 70 may be employed with chalk as a filler. Such PVC may, for instance, be present in an amount of 70%, with 25% filler, and 5% additives, such as 2.5% stabilizers, 1.8% lubricant and 0.7% color pigment. Suitable stabilizers include cadmium zincate, and suitable lubricants include stearic acid.

According to a further example, 90% of bulk PVC of a K-factor of 70 may be blended with 4% of carbon black as filler, 4% of mercaptan-type stabilizer as additive, and 2% lubricant, also as an additive.

According to still another example, 65% of suspension-type PVC of a K-factor of 65 and 20% of PVC acryl copolymer are blended with 10% of titanium dioxide as filler, 3.5% of a zinc-type stabilizer, and 1.5% of a lubricant, such as E-wax.

4. Application cited by way of example as above, an unplasticized PVC-plastic pre-blend for bottles was continuously prepared according to the following formulation: 100 parts of a bulk or suspension-PVC (40) with a K-factor of 50–55 are continuously fed into the inlet of the continuous mixer (13) by means of a metering scale (12), simultaneously another metering scale feeds the additive of a pre-blend of 10 parts of methylmetacrylate-butadiene-styrene copolymer (MBS) for impact strength and 1.2 parts of thio-dioctyl stannate as a stabilizer and a third metering scale feeds 1.5 parts of calcium stearate as a processing agent. If the preheating of the softening agents is simultaneously applied in combination with a narrowed shearing slit, the degree of effectiveness of the kinematic energy-introduction is 60–70% with unplasticized PVC, resp. 45–70% with plasticized PVC. Examples 2 and 4 are based on formulations as cited in the following publication:

BHL-Compounding Manual by W. V. Titow et al. Published by Buss-Hamilton Ltd. (1979), Chapter CA1, p. 6, and CA3, p. 3.

The subject invention resides also in apparatus for a continuous conversion of granulated PVC material and additive substances to a free-flowing pre-blend, comprising a rotary disc mixer, such as the mixer 13 shown in the drawings and described above as forming with the aid of one or more rotors 15, rings 45 and wings 38, the defined first, second and third zones, with sufficiently narrow gap 46 to effect melting of additive substances.

The subject extensive disclosure suggests to those skilled in the art various modifications and variations within the spirit and scope of the subject invention and equivalents thereof.

We claim:

1. Process for a continuous conversion of granulated PVC material and additive substances to a free-flowing pre-blend, comprising in combination the steps of:
   mechanically intermixing at room temperature the PVC material and additive substances in a first zone continuously transversed thereby to provide a macroscopically homogeneous admixture thereof;
   melting said additive substances in a subsequent second zone; and
   absorbing the molten additive substances with said granulated PVC material in a subsequent third zone to provide said free-flowing pre-blend.

2. Process according to claim 1, including the step of:
   passing said pre-blend through a second set of three zones corresponding to said first, second and third zones.

3. Process according to claim 1, including the step of:
   wetting said macroscopically homogeneous admixture of PVC material and additive substances with at least one heated liquid component.

4. Process according to claim 3, including the step of:
   passing said pre-blend through a second set of three zones corresponding to said first, second and third zones.

5. Process according to claim 1, wherein:
   said mechanically intermixed PVC material and additive substances are momentarily heated by mechanical friction in said second zone to melt said additive substances.

6. Process according to claim 1, including the step of:
   driving said mechanically intermixed PVC material and additive substances through a gap sufficiently narrow to effect said melting of the additive substances.

7. Process according to claim 1, including the steps of:
   providing a rotating disc mixer for mechanically intermixing said PVC material and additive substances in said first zone and driving said mechanically intermixed PVC material and additive substances through a gap in said second zone sufficiently narrow to effect said melting of the additive substances.

8. Process according to claim 1, including the steps of:
   driving said mechanically intermixed PVC material and additive substances through a gap sufficiently narrow to effect said melting of the additive substances; and
   passing said pre-blend through a second set of three zones corresponding to said first, second and third zones.

9. Process according to claim 1, including the steps of:
   driving said mechanically intermixed PVC material and additive substances through a gap sufficiently narrow to effect said melting of the additive substances; wetting said macroscopically homogeneous admixture of PVC material and additive substances with at least one heated liquid component; and
   passing said pre-blend through a second set of three zones corresponding to said first, second and third zones.

10. Process for a continuous conversion of granulated PVC material, additive and filler to a free flowing pre-blend, comprising in combination the steps of:

mechanically intermixing at room temperature the PVC material, additives and filler in a first zone continuously transversed thereby to provide a macroscopically homogeneous admixture thereof;

melting said additives in a subsequent second zone; and absorbing the molten additives with said granulated PVC material in a subsequent third zone to provide said PVC material momentarily with a sticky surfact to which said filler adheres, to provide said free-flowing pre-blend.

11. Process according to claim 10, including the step of:

passing said pre-blend through a second set of three zones corresponding to said first, second and third zones.

12. Process according to claim 10, including the step of:

wetting said macroscopically homogeneous admixture of PVC material, additives and filler with at least one heated liquid component.

13. Process according to claim 12, including the step of:

passing said pre-blend through a second set of three zones corresponding to said first, second and third zones.

14. Process according to claim 10, wherein:

said mechanically intermixed PVC material, additives and filler are momentarily heated by mechanical friction in said second zone to melt said additive substances.

15. Process according to claim 10, including the step of:

driving said mechanically intermixed PVC material, additives and filler through a gap sufficiently narrow to effect said melting of the additive substances.

16. Process according to claim 10, including the steps of:

driving said mechanically intermixed PVC material, additives and filler through a gap sufficiently narrow to effect said melting of the additive substances; and passing said pre-blend through a second set of three zones corresponding to said first, second and third zones.

* * * * *